US008769190B1

(12) United States Patent
Syu et al.

(10) Patent No.: US 8,769,190 B1
(45) Date of Patent: Jul. 1, 2014

(54) SYSTEM AND METHOD FOR REDUCING CONTENTIONS IN SOLID-STATE MEMORY ACCESS

(75) Inventors: Mei-Man L. Syu, Fremont, CA (US); Matthew Call, Ladera Ranch, CA (US); Ho-Fan Kang, Aliso Viejo, CA (US); Lan D. Phan, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 3 days.

(21) Appl. No.: 13/214,132

(22) Filed: Aug. 19, 2011

Related U.S. Application Data

(60) Provisional application No. 61/383,284, filed on Sep. 15, 2010.

(51) Int. Cl.
*G06F 12/00* (2006.01)
(52) U.S. Cl.
USPC ........................................... 711/103; 711/173
(58) Field of Classification Search
USPC .......................................... 711/102, 103, 173
See application file for complete search history.

(56) References Cited

U.S. PATENT DOCUMENTS

| 2002/0053011 | A1* | 5/2002 | Aiken et al. | 711/170 |
| 2002/0144066 | A1* | 10/2002 | Talreja et al. | 711/154 |
| 2005/0144357 | A1* | 6/2005 | Sinclair | 711/103 |
| 2005/0204091 | A1* | 9/2005 | Kilbuck et al. | 711/103 |
| 2008/0147968 | A1 | 6/2008 | Lee et al. | |
| 2011/0138148 | A1* | 6/2011 | Friedman et al. | 711/173 |

* cited by examiner

*Primary Examiner* — Kalpit Parikh (57) ABSTRACT

Embodiments of the invention are directed to enabling concurrent commands from command requesters in a non-volatile solid-state storage subsystem in a manner that reduces contentions among the commands. Embodiments group blocks of memory into multiple sets of superblocks and associate a command requester to each superblock set. In one embodiment, the superblock sets are dynamically associated with a requester. In one embodiment, the superblock sets are dynamically associated with requesters based in part on at least one of internal memory management needs and host command throughput. In one embodiment, an erase command is executed on a superblock within a set and a simultaneous write command is executed on a superblock within another set.

26 Claims, 7 Drawing Sheets

SYSTEM AND METHOD FOR REDUCING CONTENTIONS IN SOLID-STATE MEMORY ACCESS

CROSS-REFERENCE TO RELATED APPLICATIONS

The present application claims priority from provisional U.S. Patent Application Ser. No. 61/383,284, filed on Sep. 15, 2010, the specification of which is incorporated herein by reference.

BACKGROUND OF THE INVENTION

In a non-volatile solid-state memory system, host commands as well as internal management commands such as those related to wear leveling and garbage collection are executed on the solid-state memory. Internal management commands typically include erase commands that are used to free blocks for later write requests. When an erase command is executed, it is typically executed on a group of blocks distributed across all dies of memory available on a memory array. Because a typical erase command is relatively long in duration and can occupy all dies of the memory, other commands may need to wait for the completion of the erase command before execution. This can impact overall memory access times.

DETAILED DESCRIPTION

While certain embodiments of the inventions are described herein, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Figure 1:
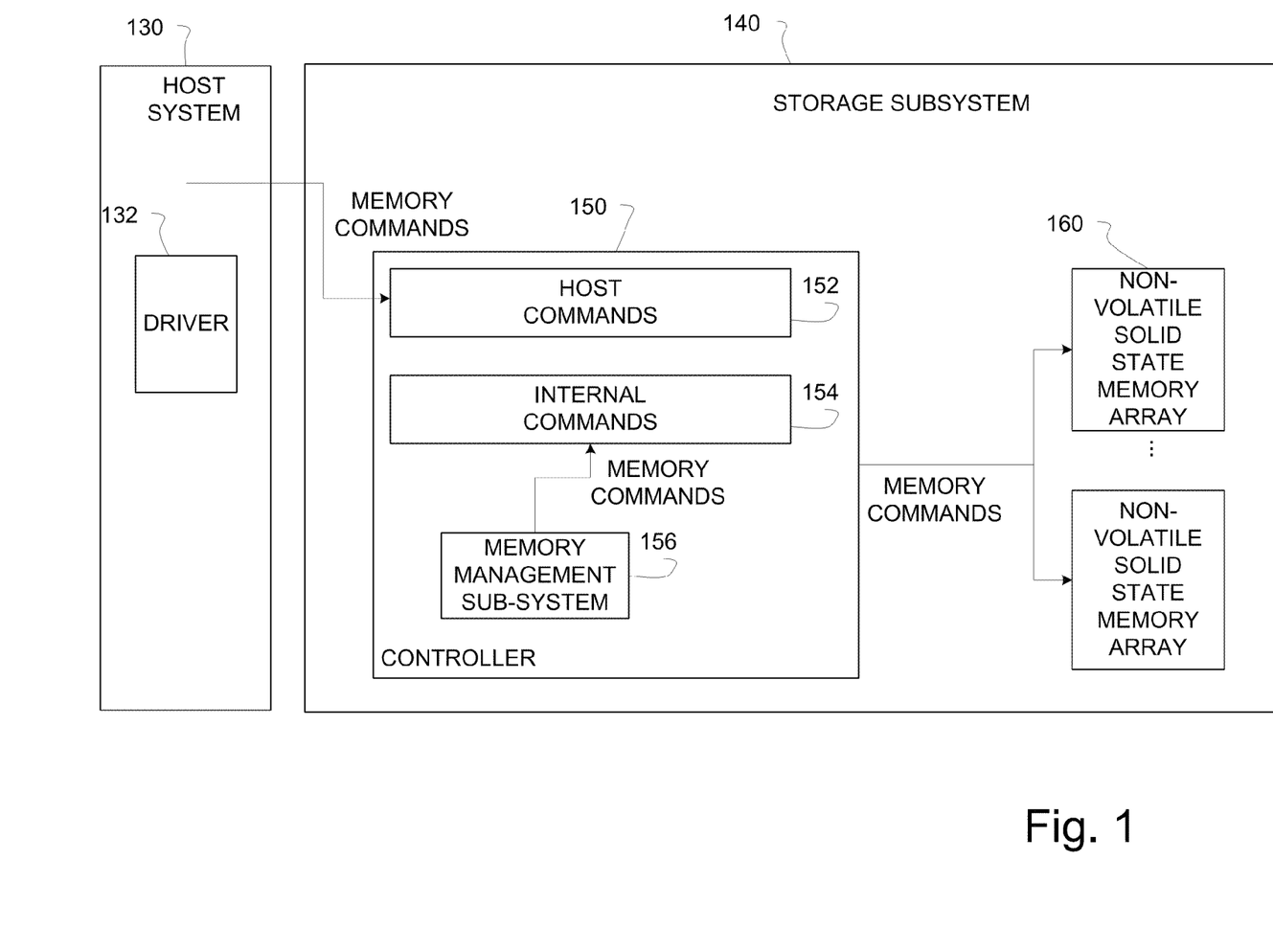
FIG. 1 provides an overview of a memory storage subsystem in accordance with one embodiment.

A broad overview of a memory storage subsystem in accordance with one embodiment is shown in FIG. 1. As shown, a storage subsystem 140 includes a plurality of non-volatile solid-state memory arrays 160. The non-volatile solid-state memory arrays 160 may include any memory array commonly known in the art which provides for durable memory storage such as non-volatile NAND flash memory. In one embodiment, the non-volatile solid-state memory arrays 160 are disposed in a collection of dies on a printed circuit board, with each die being connected to a controller 150 via a communications channel. In one embodiment, the memory within a die is arranged in a hierarchy, for example, in descending addressable size by plane, block and page, and the dies themselves are arranged into groups of one or more dies that are accessible by data channels. In some configurations, depending on the particular memory command, a block or a page is the smallest independently addressable unit of memory, though other configurations are possible.

In one embodiment, the non-volatile solid-state arrays 160 receive memory commands from the controller 150, which in turn receives memory commands from a host system 130. The host system 130 includes a driver 132 in communication with the controller 150. In one embodiment, commands from the host system 130 provided to the controller 150 are stored as host commands 152 for execution on the non-volatile solid-state memory arrays 160.

In one embodiment, the controller 150 includes a memory management subsystem 156. The memory management subsystem monitors the memory commands executed on non-volatile solid-state memory arrays 160 and requests internal memory management commands 154. For example, the memory management subsystem can be responsible for requesting commands for wear leveling and garbage collection operations. Wear leveling commands generally relate to averaging the number of erase operations across all blocks in a die and preventing blocks from receiving significantly uneven use. Garbage collection commands generally relate to freeing memory which is no longer being used, so that the memory is available for future write commands. A typical garbage collection command would process a unit of memory such as a block by copying valid data within the unit to new location(s) and then erasing the entire unit so that it becomes available for future write commands. Generally, it is preferable for the internal management commands of the memory storage subsystem (e.g., wear leveling and garbage collection) to operate invisibly to the host system, and to place, to the extent possible, the least amount of additional burden on host access times and throughput.

Single Superblock Set

Figure 2:
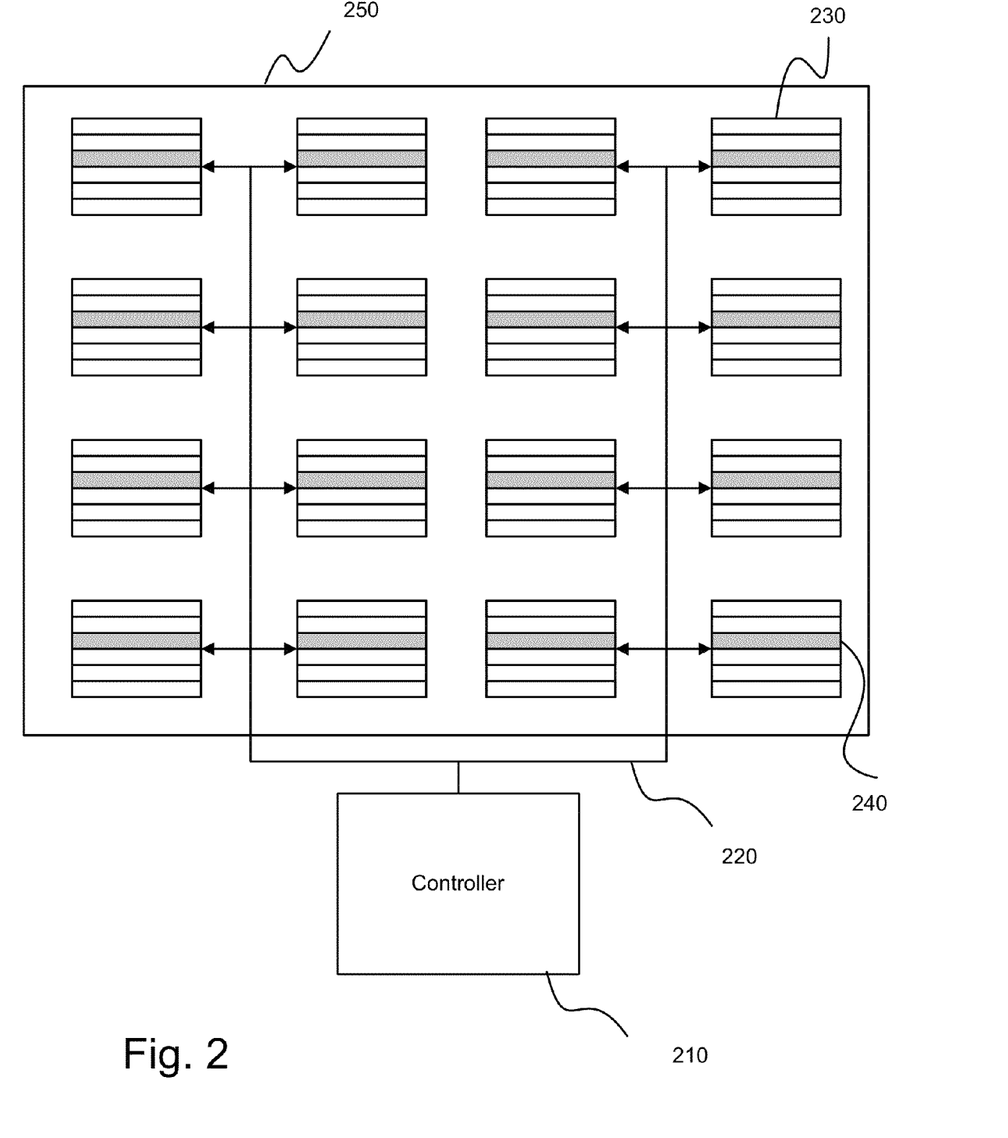
FIG. 2 shows an example grouping of superblocks in a memory array.

FIG. 2 shows an embodiment of a memory arranged in a single superblock set configuration. In one embodiment, a superblock is a grouping of blocks from more than one die, in a system where a block is the smallest independently addressable unit of memory for a write command. Shown in FIG. 2 is a controller 210 that issues commands to dies 230. In this embodiment, the controller 210 issues commands through two channels 220, each channel 220 in communication with the eight dies 230. In other embodiments, other combinations and arrangements of die and channel are possible. In this embodiment, the superblock 250 logically encompasses one block 240 from each of the dies 230, and the encompassed blocks are illustrated in shaded grey. Although FIG. 2 shows the third block in each die as being included in the superblock 250, in practice, a superblock can include blocks from different locations on each die. For example, a superblock may include the first block in a first die, the third block in a second die, a seventh block in a third die, and so on. The physical blocks associated with a superblock may also change over time during the operation of the storage subsystem, due to, for example, the performance of wear leveling operations. In one embodiment, a set of superblocks includes multiple superblocks, with each superblock in the set including a block from each die in the set as described above. As an example, a set may include a first superblock comprising the first block of each die in the set, a second superblock comprising the second block of each die in the set, a third superblock comprising the third block of each die in the set, and so forth.

In one embodiment, when the memory management subsystem 156 requests an erase command (e.g., for the purpose of garbage collection), the controller issues the erase command to an entire superblock. Accordingly, when an erase command is issued in the embodiment of FIG. 2, the erase command is executed on all of the dies in the memory array at once.

Accessing the memory by using the superblock configuration is helpful because it can increase concurrency in the system. In one embodiment, by using a superblock, when write commands are received, they can be executed on sequential dies within a superblock. For example, while a first die is active on a write command, a subsequent write command will not need to wait on the first die to complete its write command, but instead can be executed on the second die in the superblock, and so on. By grouping the blocks from dies together into a superblock, increased concurrency can be achieved by enabling additional dies to be active at once. In these circumstances, to ensure the superblock is able to receive and execute the concurrent requests to write for a superblock, an erase command is performed for all blocks in a superblock. This ensures that when erased, the superblock is fully available for write concurrency. When an erase command is requested for all dies in a superblock simultaneously, any write command directed to those same dies are delayed and must wait for the erase command to complete, a condition that is termed a "contention." When this occurs in an embodiment with a single superblock set, to the host system it may appear that the storage subsystem is providing high throughput for write commands and then suddenly stalls.

Multiple Superblock Sets

Figure 3A:
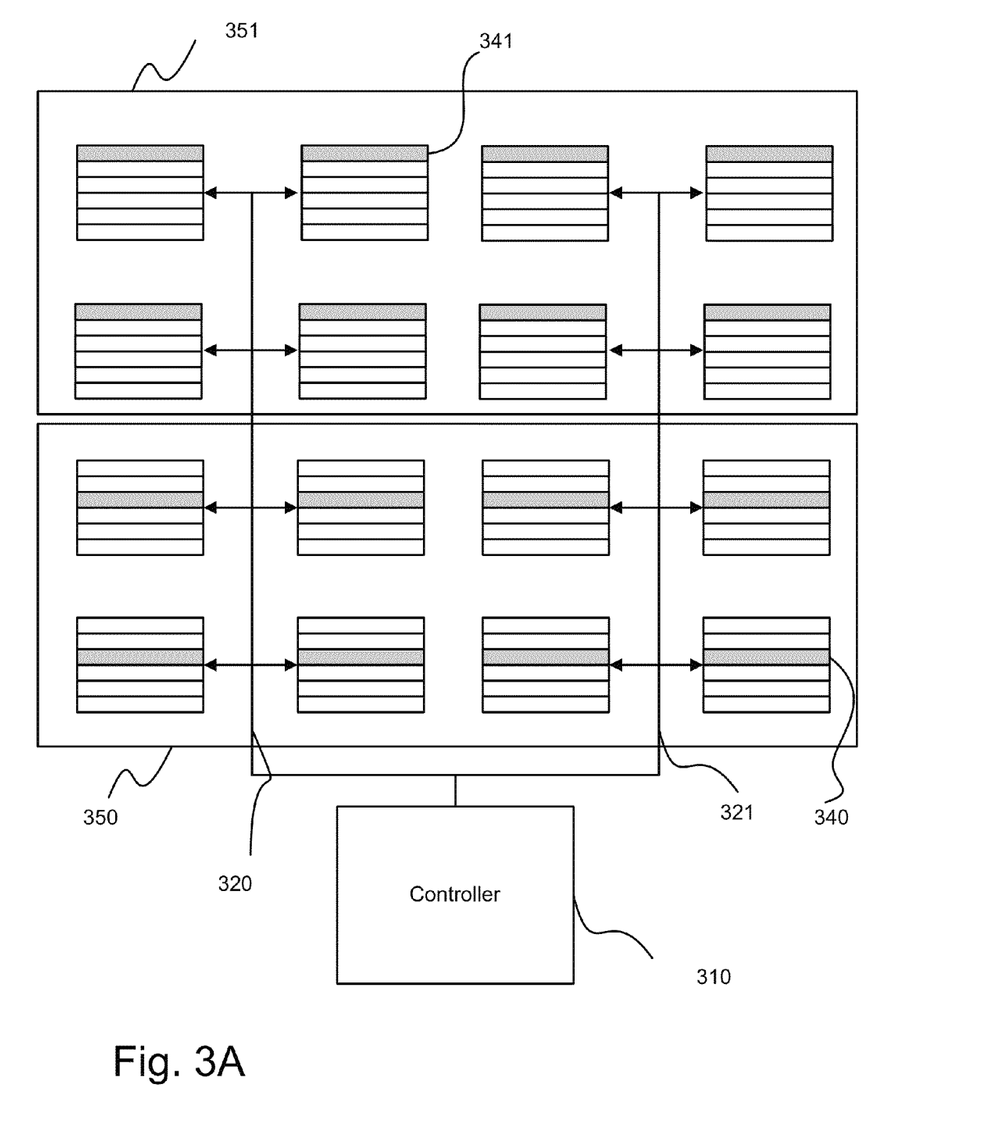
FIGS. 3A-3C illustrate examples of grouping superblocks to improve access request handling according to several embodiments.
Figure 3B:
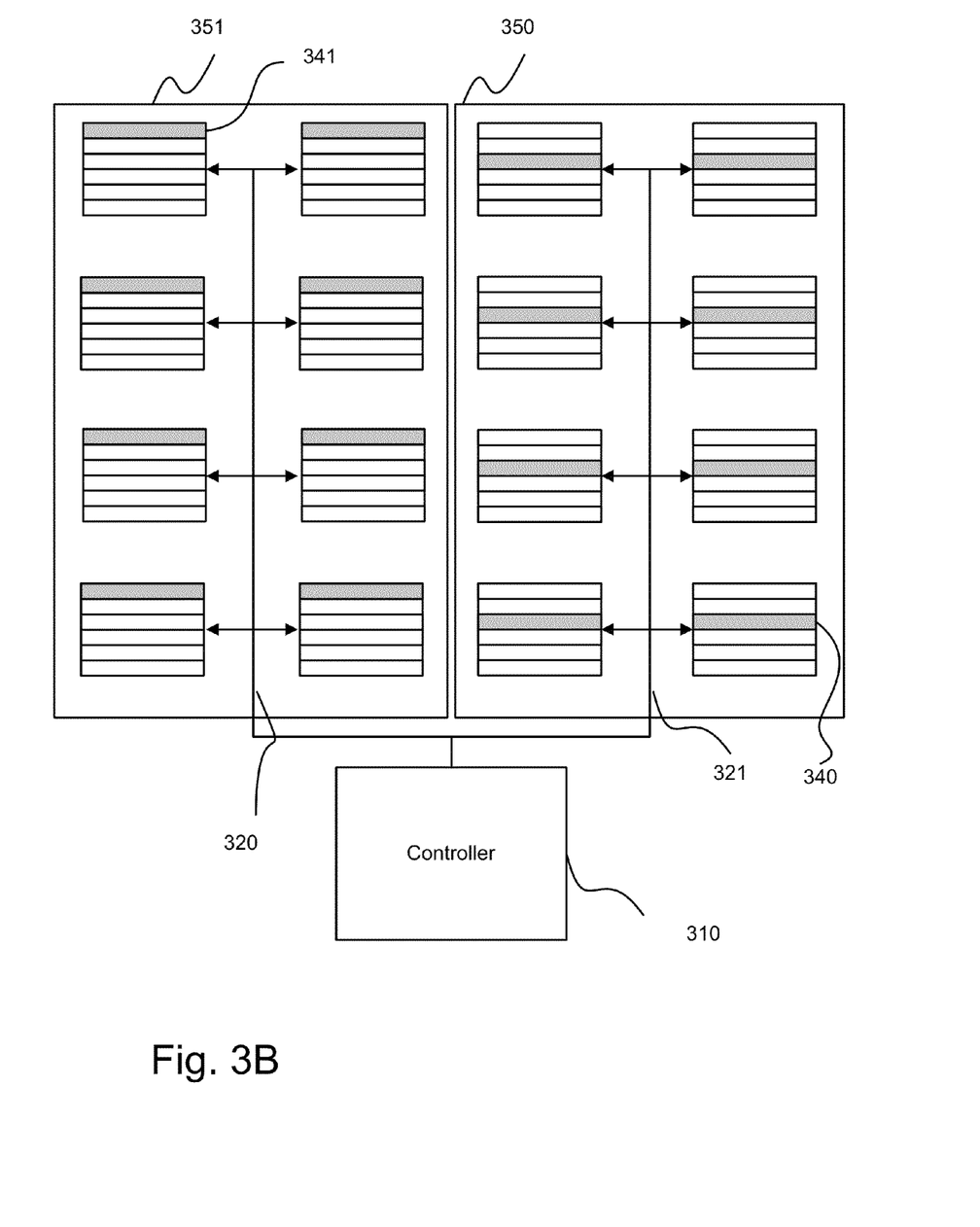
Figure 3C:
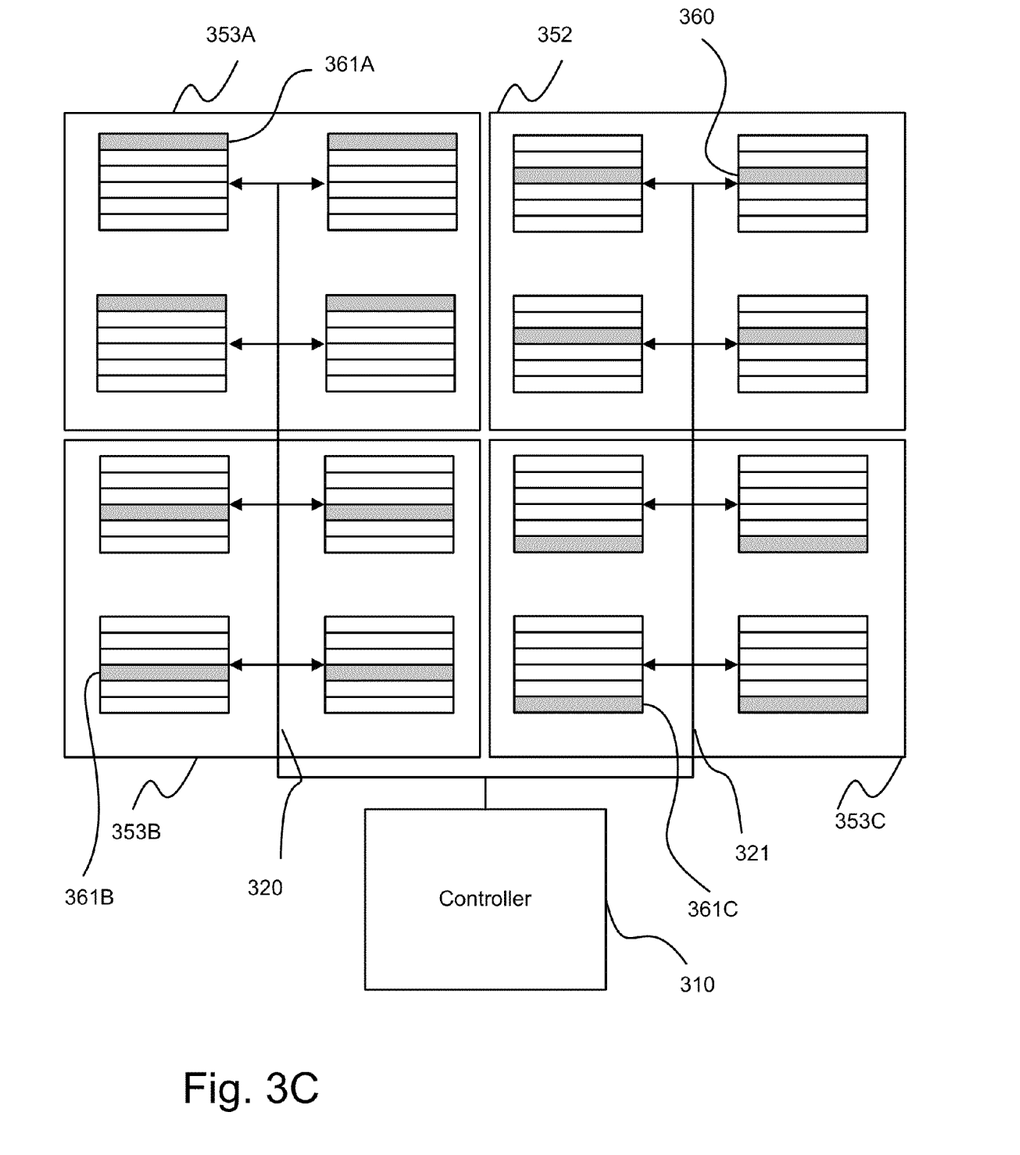

As an alternative to using the single superblock set configuration that encompasses all of the dies in an array, one embodiment reduces contentions by utilizing multiple superblock sets designated to handle different memory commands, with each superblock set encompassing a portion of the dies in an array. FIGS. 3A-C show several embodiments that use multiple superblock sets. With the memory divided into multiple superblock sets, the various subsystems requesting access to the memory can each be associated with each of the superblock sets. With reference to FIG. 3A, the memory management subsystem can operate on (i.e., send commands to) a superblock 340 belonging to a first superblock set 350, while host commands can be executed on a superblock 341 belonging to a second superblock set 351. As shown, each of the first set of superblocks 350 encompasses the bottom eight dies while each of the second set of superblocks 351 encompasses the top eight dies. The superblock 340 is shown as a group of shaded blocks within the dies in the superblock set 350 while the superblock 341 is shown as a group of shaded blocks within the dies in the superblock set 351. When the memory management subsystem issues an erase command (e.g., for a garbage collection operation) for dies in the superblock set 350, there is no contention between its erase command and host commands that are being executed in the superblock set 351. When a host requests a write command to the memory array, the write command is directed to an open block in the superblock 341 and can be executed immediately without contention with the erase commands that are being executed on the superblock 340.

During operation of the memory storage subsystem, the associated commands for each superblock set may dynamically change in one embodiment. For example, as the host requests write commands to the superblock 340, the superblock 340 may require garbage collection operations. If this occurs, the controller 310 can switch the designation of the superblock sets so that host write commands can be directed to a superblock within the second superblock set 351 (e.g., the superblock 341), and garbage collection operations can be performed on the superblock 340, which is within the first superblock set 350. Host read commands, because they are generally associated with a specific logical address, may require read access to the superblock set 350, in which case such host read commands may need to wait for contention resolution (resolving the contention between the read commands and the erase commands) to access the superblock set 350.

As shown in FIGS. 3A and 3B, superblock sets can be selected in a variety of ways. For example, the superblock sets 350 and 351 in FIG. 3A each span across the channels 320 and 321 in the storage subsystem. Alternatively, as shown in FIG. 3B, each the superblock sets 350 and 351 can include dies within a single channel.

In FIG. 3C, another embodiment is shown in which four superblock sets are used for providing access to an example memory array. This may provide an advantage by allowing the system to dynamically allocate a ratio of associated superblock sets to specific types of commands. For example, in one embodiment, internal memory commands such as those for garbage collection can be executed on a first superblock set 352 including a superblock 360 and host requests can be executed on other superblock sets 353A-C (including superblocks 361A-C). The superblock 360 is shown as a group of shaded blocks within the dies in the superblock set 352 while the superblocks 361A-C are shown as groups of shaded blocks within the dies in the superblock sets 353A, 353B, and 353C, respectively. In that case, host write commands are performed on three of the four active superblock sets (the superblock sets 353A-C), while garbage collection continues on the fourth superblock set (e.g., the superblock set 352). In various embodiments, any variation of allocating the superblock sets to host commands and internal memory commands (e.g., garbage collection commands) is possible. For example, in one embodiment, if the storage subsystem is experiencing heavy host write command volume, the storage subsystem may temporarily allocate all of the superblock sets to host commands and reduce the number of superblocks on which garbage collection is performed. As an alternative, if the memory array is running low on free blocks, the storage subsystem may temporarily allocate additional superblock sets to garbage collection (e.g., two of four sets, three or four sets, or all four sets).

There are additional variations to the multiple superblock set configuration in other embodiments. First, garbage collection and host commands are used here as examples only, as other internal memory command types may also be used and allocated to the superblock sets as necessary. Second, although only four dies per set are shown in the example illustration of FIG. 3C, in one embodiment, each set is configured to encompass 32 dies in a 128-die storage subsystem. Other similar configurations may be used for a storage subsystem with 64 dies, 256 dies, and so on. Third, although a four-superblock set embodiment is shown in FIG. 3C, other embodiments may use any number of superblock sets. As the number of superblock sets increases, the level of granularity for dynamically changing the ratio of superblock sets allocated to each command requestor (e.g., host or internal memory management) can increase.

The allocation of superblock sets to the various command requesters can be performed in a variety of ways. For example, in one embodiment, the controller may have a routine that assigns each superblock set to a specific requester for a particular type of operation (e.g., one or more sets to host write commands and one or more sets to garbage collection commands). In some embodiments, the superblock set(s) associated with the individual requesters can be determined by the controller, and thus unknown to the individual requesters. Instead, the controller will assign a physical write location to a command from the individual requester according to an open superblock in a superblock set associated with that requester. The requester in this scenario may only need to maintain a record of the logical write locations associated with its data.

As an alternative, the requesters may be able to specifically request a particular superblock set. For example, in one embodiment, the memory management subsystem, which handles garbage collection, may have noticed that a particular superblock in a superblock set is more in need of garbage collection than the superblock that is currently being garbage collected. The memory management subsystem may notify a superblock allocation routine on the controller and wait until the routine assigns the particular superblock in need of garbage collection to the memory management subsystem.

In another embodiment, a requester can notify other requesters that the requester is to begin work on a particular superblock. This could either be implemented as a master/slave arrangement or with each requester able to notify the others. For example, the memory management subsystem may determine that a first superblock needs additional free blocks to be generated by garbage collection. The memory management subsystem will then notify the other requesters to use superblocks in other superblock sets. For garbage collection purposes, the memory management subsystem is generally sensitive to the particular superblock it is accessing (preferably freeing memory in the superblock with the most dirty blocks), while host write commands are generally indifferent to the superblock being used and the corresponding physical write location. The memory management subsystem can indicate to the other requesters the superblock(s) for which it will request garbage collection commands, and the other requesters will then address their commands to superblock(s) in other superblock set(s).

Command Processing in Multiple Superblock Set Embodiments

Figure 4:
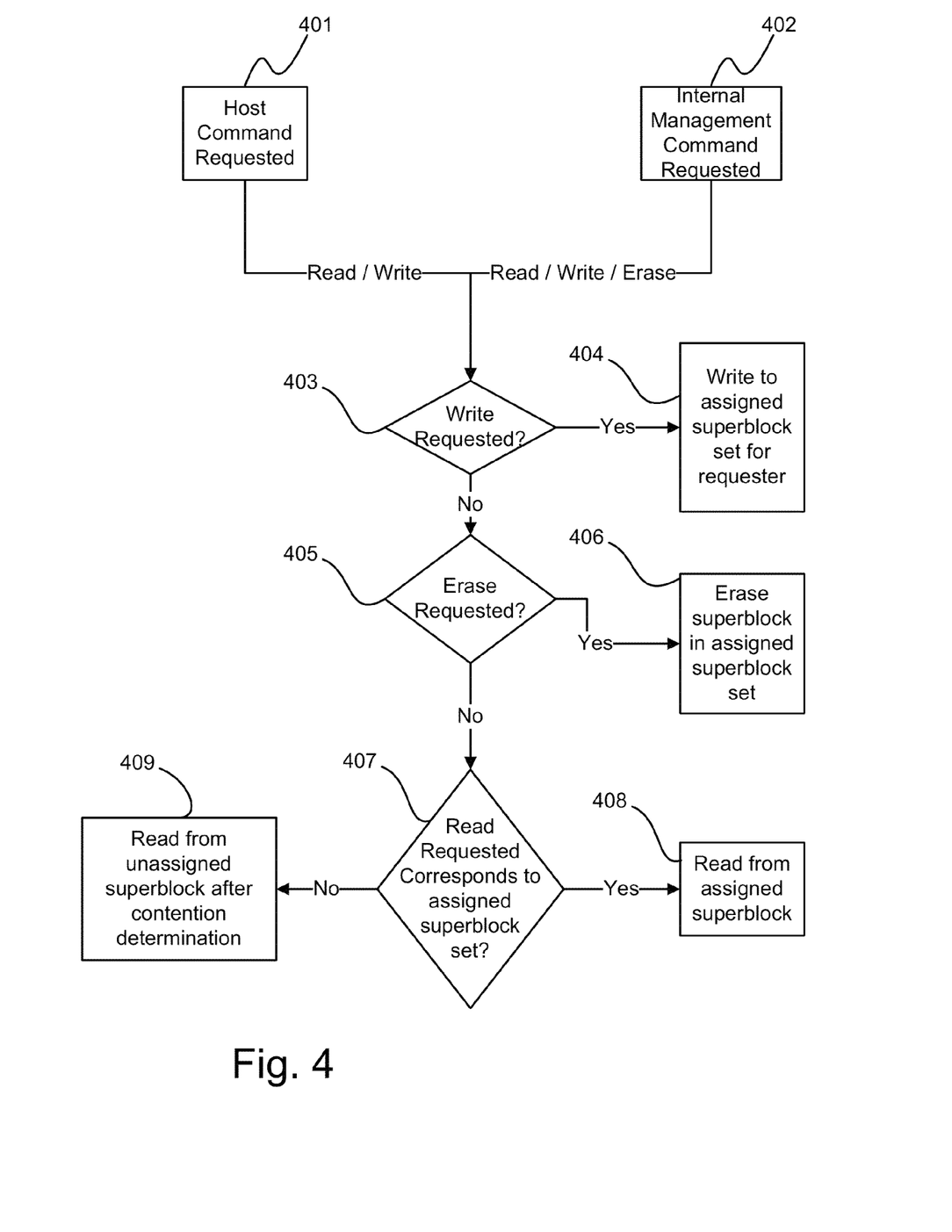
FIG. 4 is a flowchart showing the handling of a request for media access in accordance with one embodiment.

FIG. 4 illustrates a flowchart depicting the flow of a command after it has been submitted by the requester in accordance with one embodiment. As shown in blocks 401 and 402, both host commands and internal management commands can be treated in a similar manner. In block 403, if it is determined that the controller has received a write command, that command can be executed on a superblock in the assigned superblock set for the requester in block 404. Likewise, if it is determined in block 405 that the controller has received an erase command, the erase command can be executed on a superblock in the assigned superblock set for the requester in block 406. Because the erase command is requested on a different superblock set than that on which other write commands are being executed, contention is prevented between the erase command and the other write commands. Finally, if the incoming command is neither a write nor an erase command, the incoming command is a read command in one embodiment. The process arrives in block 407 and determines whether the read command corresponds to the assigned superblock set, because read commands can correspond to blocks outside the assigned superblock set for a requester. If this is the case, as shown in block 409, the read command may need to wait until contention has been resolved with other commands at the superblock set associated with the read command. Otherwise, the read command is executed in block 408. In one embodiment, the controller includes logic for performing the determination in blocks 403, 405, and 407, and the performance of those determinations can occur either in a different sequence than that shown or concurrently. In one embodiment, the controller performs the operations in blocks 404, 406, 408, and 409, and they may be performed either in a different sequence than that shown or concurrently.

Execution Timing Examples

Figure 5A:
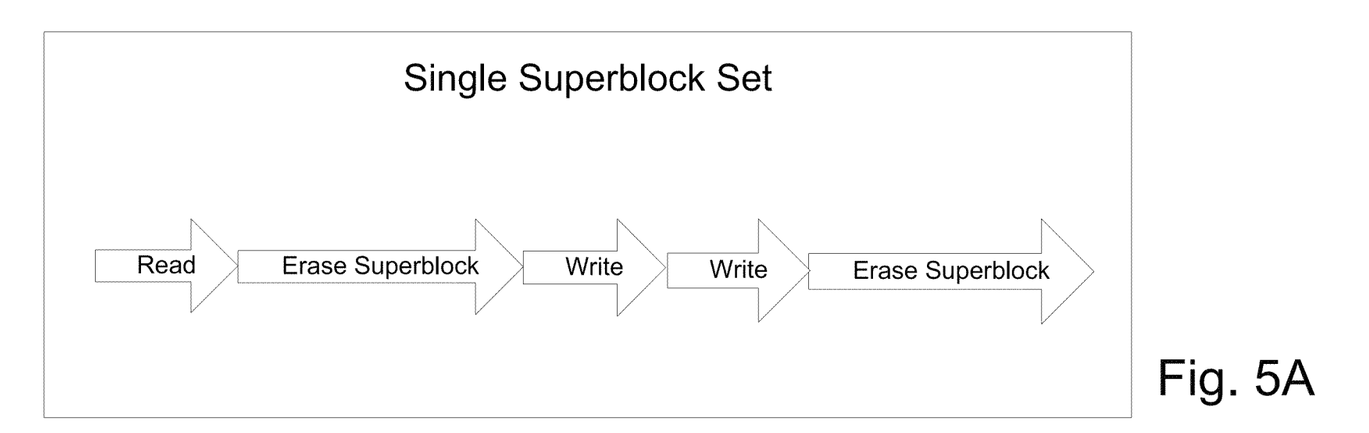
FIGS. 5A and 5B compare the execution timing of commands in a single superblock set embodiment to that in a multiple superblock set embodiment.
Figure 5B:
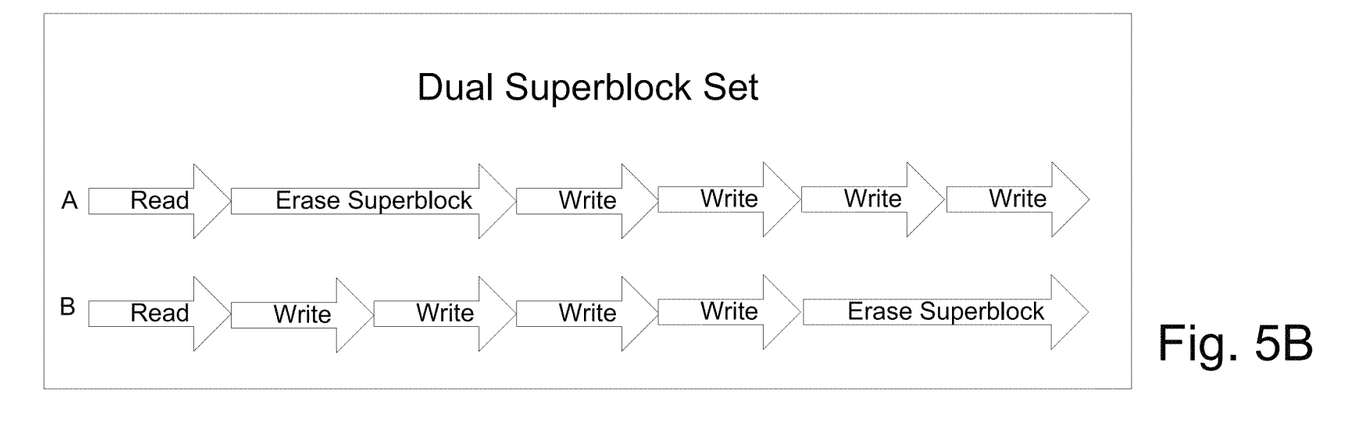

FIGS. 5A and 5B illustrate timelines of memory accesses according to single and dual superblock set embodiments. This timeline is for illustrative purposes only and not to scale, as a typical read command execution time is typically shorter than a write command execution time, which is typically shorter than an erase command execution time. The specific operation execution timing will depend on the memory array components used in a storage subsystem. As shown in FIG. 5A, when a single superblock set is used to encompass blocks from all dies in an entire memory array, the erase commands prevent other commands from being executed concurrently on any other portions of the memory array. FIG. 5B shows portions of the memory array (e.g., dies) grouped into superblock sets A and B. In FIG. 5B, the erase command executed on set A does not block write commands from being executed on set B. In one embodiment, after the erase command is completed on set A, if the memory management subsystem has no current commands (e.g., for garbage collection) to execute, write commands can be issued for both sets A and B. This can be accomplished by allocating both superblock sets A and B to host write commands, as described above. If the memory management subsystem determines an erase should be performed on set B for garbage collection, set B can be allocated to the memory management subsystem, as described above. When the memory management subsystem executes its erase commands on set B, write commands can continue to be executed on set A. In this way, unless the memory management subsystem requests erase commands for all superblocks, host write commands can be executed without contention.

Although embodiments have been described above as grouping blocks together to form superblocks, alternative groupings of memory units to improve response time and concurrency are possible in keeping with the disclosure above. These alternative groupings could be accomplished at different levels of the memory hierarchy (e.g., dies, planes, pages, etc.) or in systems with different addressable memory structures.

CONCLUSION

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:
1. A storage subsystem, comprising:
 a controller;
 a solid-state memory management subsystem; and
 a non-volatile solid-state memory array including a plurality of memory units, each memory unit capable of being independently accessed, the plurality of memory units being subdivided into a plurality of distinct sets, each set comprising one or more, but less than all, of the plurality of memory units;

wherein the controller is configured to allocate a first set of the plurality of distinct sets of memory units for operations associated with the solid-state memory management subsystem, and to allocate a second set of the plurality of distinct sets of memory units for operations associated with a host device based at least in part on a ratio of a number of memory units designated for execution of operations associated with the solid-state memory management subsystem to a number of memory units designated for execution of operations associated with the host device, the ratio being based at least in part on a runtime condition comprising a number of free memory units in the non-volatile solid-state memory array, and wherein the controller is further configured to update the ratio in response to determining that the number of free memory units is below a free memory threshold so that additional memory units are allocated to the first set for operations associated with the solid-state memory management subsystem.

2. The storage subsystem of claim 1, wherein each of the memory units is the smallest unit of memory capable of being independently addressed.

3. The storage subsystem of claim 1, wherein the controller is further configured to update the ratio and dynamically allocate the first and second sets of memory units based at least in part on the updated ratio.

4. The storage subsystem of claim 1, wherein the runtime condition further comprises a data throughput to be provided to the host device.

5. The storage subsystem of claim 1, wherein the controller is further configured to allocate all of the memory units of the plurality of memory units to one of the first and second sets.

6. The storage subsystem of claim 1, wherein the operations associated with the solid-state memory management subsystem comprise a garbage collection operation.

7. The storage subsystem of claim 1, wherein the operations associated with the solid-state memory management subsystem comprise a wear leveling operation.

8. The storage subsystem of claim 1, wherein said controller is further configured to execute at least some operations associated with the solid-state memory management subsystem simultaneously with at least some operations associated with the host device.

9. The storage subsystem of claim 1, wherein the operations associated with the solid-state memory management subsystem comprise an erase command.

10. The storage subsystem of claim 1, wherein each memory unit comprises a memory block in a memory die and each set of the plurality of sets comprises a superblock.

11. The storage subsystem of claim 10, wherein each superblock comprises memory blocks in memory dies accessible via a plurality of data channels.

12. The storage subsystem of claim 10, wherein each superblock comprises memory blocks in memory dies accessible via a data channel.

13. The storage subsystem of claim 1, wherein the runtime condition comprises a reduction of a delay associated with contention between the operations associated with the solid-state memory management subsystem and the operations associated with the host device.

14. The storage subsystem of claim 4, wherein the controller is further configured to:

in response to determining that the data throughput is below a throughput threshold, update the ratio so that additional memory units are allocated to the second set for operations associated with the host device.

15. A method of managing memory storage in a non-volatile solid-state memory array including a plurality of memory units, each memory unit capable of being independently accessed, the method comprising:

receiving, from a host system, a plurality of host memory commands;

receiving, from an internal logic device, a plurality of internal memory management commands;

designating a plurality of distinct sets for the memory units, each set comprising one or more, but less than all, of the plurality of memory units;

assigning each of the plurality of sets to host memory commands or internal memory management commands based at least in part on a ratio of a number of memory units designated for execution of internal memory management commands to a number of memory units designated for execution of host memory commands, the ratio being based at least in part on a runtime condition comprising a number of free memory units in the non-volatile solid-state memory array; and updating the ratio in response to determining that the number of free memory units is below a free memory threshold so that additional memory units are allocated to one or more sets of memory units assigned to execution of internal memory management commands.

16. The method of claim 15, further comprising:

executing the host memory commands on one or more of the sets assigned to host memory commands; and executing the internal memory management commands on one or more of the sets assigned to internal memory management commands, wherein the execution of the host memory commands and the execution of the internal memory management commands are performed concurrently.

17. The method of claim 15, wherein the internal memory management commands comprise an erase command.

18. The method of claim 15, wherein assigning each of the plurality of sets to host memory commands or internal memory management commands further comprises dynamically determining the number of memory units designated for execution of the host memory commands based at least in part on a data throughput to be provided to the host system.

19. The method of claim 15, wherein the internal memory management commands comprise a command related to a garbage collection operation.

20. The method of claim 15, wherein the internal memory management commands comprise a command related to a wear leveling operation.

21. The method of claim 15, wherein each memory unit comprises a memory block in a memory die and each set of the plurality of sets comprises a superblock.

22. The method of claim 21, wherein superblock comprises memory blocks in memory dies accessible via a plurality of data channels.

23. The method of claim 21, wherein each superblock comprises memory blocks in memory dies accessible via a data channel.

24. The method of claim 15, wherein the runtime condition further comprises a data throughput to be provided to the host system.

25. The method of claim 15, wherein the runtime condition further comprises a reduction of a delay associated with contention between the host memory commands and internal memory management commands.

26. The method of claim 24, further comprising:
in response to determining that the data throughput is below a throughput threshold, updating the ratio so that additional memory units are allocated to one or more sets of memory units assigned to execution of host memory commands.

\* \* \* \* \*